United States Patent [19]
Beall et al.

[11] 3,928,533
[45] Dec. 23, 1975

[54] BASE METAL TITANATE CATALYSTS
[75] Inventors: George H. Beall, Big Flats; David M. Miller, Elmira; Hermann L. Rittler, Horseheads, all of N.Y.
[73] Assignee: Corning Glass Works, Corning, N.Y.
[22] Filed: Mar. 7, 1974
[21] Appl. No.: 448,834

Related U.S. Application Data
[63] Continuation-in-part of Ser. No. 294,074, Oct. 2, 1972, abandoned.

[52] U.S. Cl. ............. 423/213.2; 423/245; 423/247; 423/213.5
[51] Int. Cl.² ........................................ B01D 53/34
[58] Field of Search........... 423/213.2, 213.5, 213.7, 423/245, 247; 252/461, 469, 472

[56] References Cited
UNITED STATES PATENTS
3,166,895  1/1965  Slayter et al..................... 423/213.2
3,202,618  8/1965  Jaffe .................................. 252/469
3,216,954  11/1965 Hawk et al................... 423/213.2 X
3,230,034  1/1966  Stiles................................ 423/213.5
3,259,453  7/1966  Stiles................................ 423/213.5

*Primary Examiner*—G. O. Peters
*Attorney, Agent, or Firm*—Kees van der Sterre; Clinton S. Janes, Jr.; Clarence R. Patty, Jr.

[57] ABSTRACT

Refractory base metal titanate catalysts showing considerable activity in the oxidation of hydrocarbons and carbon monoxide, comprising titaniferous crystal phases of spinel, ilmenite and/or pseudobrookite structure which consist essentially, in weight percent on the oxide basis, of about 15–85% $TiO_2$, 15–70% $M''O$ wherein $M''$ is $Mn^{+2}$, $Co^{+2}$, $Fe^{+2}$ or $Cu^{+2}$, and 0–60% $M_2'''O_3$ wherein $M'''$ is $Al^{+3}$, $Fe^{+3}$, $Cr^{+3}$, $Mn^{+3}$ or $Co^{+3}$, are disclosed.

6 Claims, 1 Drawing Figure

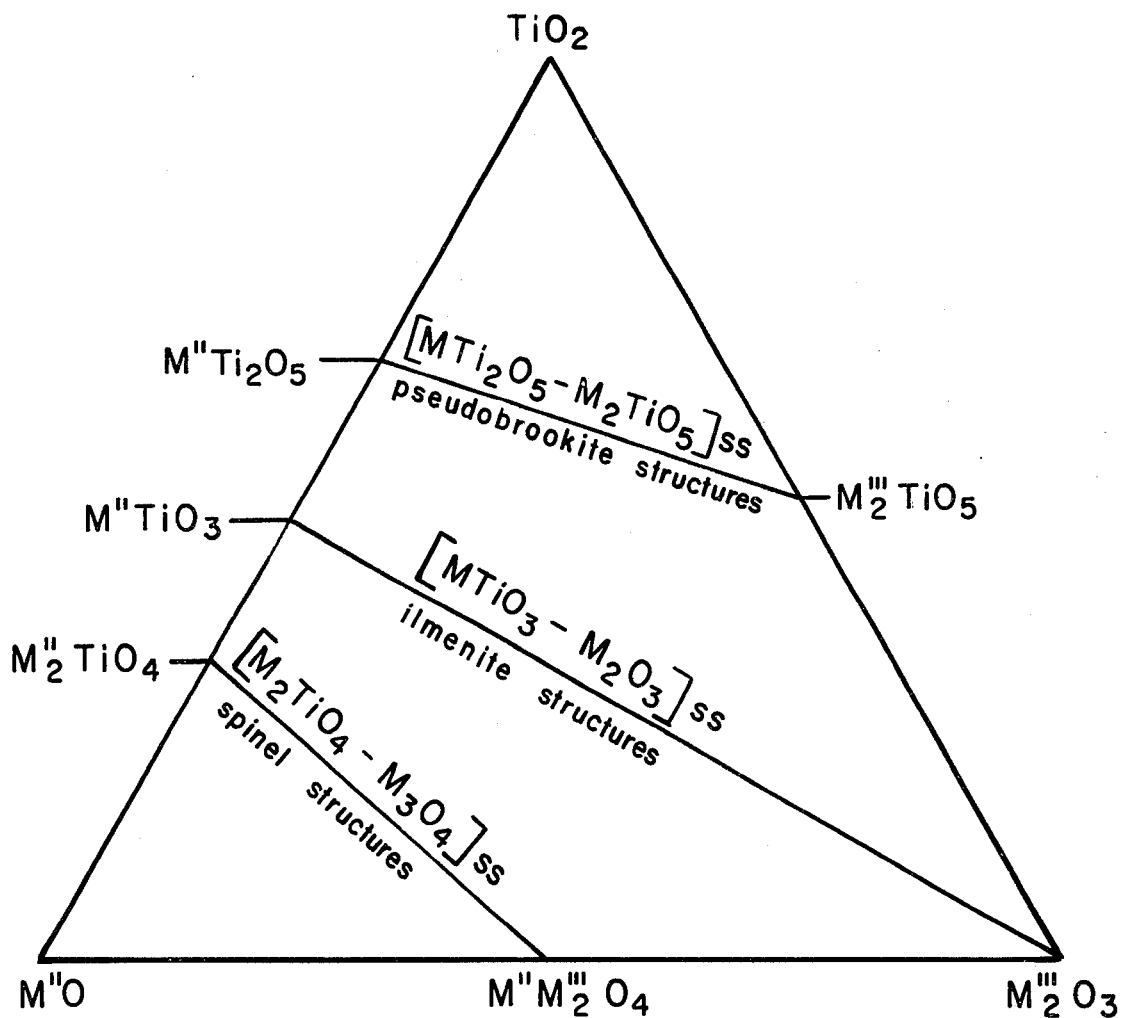
M"O–M'''$_2$O$_3$–TiO$_2$ SYSTEM

BASE METAL TITANATE CATALYSTS

CROSS REFERENCE TO RELATED APPLICATION

This application is a continuation-in-part of the application of George H. Beall, David M. Miller and Hermann L. Rittler, Ser. No. 294,074, filed Oct. 2, 1972, now abandoned.

BACKGROUND OF THE INVENTION

The present invention has general application in the field of oxidation catalysis and particular application in the treatment of gases to oxidize hydrocarbons and carbon monoxide present therein. In the automotive exhaust emissions control field, for example, the catalysts of the present invention provide a means for oxidizing a significant proportion of carbon monoxide and hydrocarbons present in exhaust gases to harmless carbon dioxide and water.

Thermal and chemical instability of the catalysts are major problems in the field of automotive exhaust emissions control. Most base and noble metal catalysts currently proposed for use in automotive exhaust systems degrade substantially with use at elevated temperatures, often through contamination from the supporting structure, loss of surface area from sintering and recrystallization, or oxidation-reduction reactions occurring at high temperatures which convert the catalysts to inactive species. An active catalyst resistant to contamination, oxidation-reduction reactions and sintering would provide significant advantages in automotive systems.

It is, therefore, a principal object of the present invention to provide a catalytic material of improved refractoriness and chemical stability for use in oxidation processes at elevated temperatures.

It is a further object of the invention to provide a process for catalytically-treating waste gases to oxidize hydrocarbons and carbon monoxide present therein which employs our chemically-stable refractory catalytic material.

Other objects and advantages of the invention will become apparent from the following detailed description thereof.

SUMMARY OF THE INVENTION

We have discovered that a series of base metal titanates shows considerable catalytic activity in the oxidation of hydrocarbons and carbon monoxide. The compositions of these catalytic materials, as defined in weight percent on the oxide basis, fall within the region of about 15–85% $TiO_2$, 15–70% $M''O$, wherein $M''$ is selected from the group consisting of $Mn^{+2}$, $Co^{+2}$, $Fe^{+2}$ and $Cu^{+2}$, and 0–60% $M_2'''O_3$, wherein $M'''$ is selected from the group consisting of $Al^{+3}$, $Fe^{+3}$, $Cr^{+3}$, $Mn^{+3}$ and $Co^{+3}$. Optionally, up to about one quarter or 25% of the $TiO_2$ present in these titanates may be replaced with $Nb_2O_5$, and appreciable amounts of certain other oxides may be present without destroying catalytic activity.

The above-described materials are crystalline in structure, typically having a major titaniferous crystal phase consisting of crystalline solid solutions of spinel ($M_2''TiO_4$–$M''M_2'''O_4$), ilmenite ($M''TiO_3$–$M_2'''O_3$) and/or pseudobrookite ($M''Ti_2O_5$–$M_2'''TiO_5$) structure. They may be prepared by sintering simple oxides or carbonates of the desired metals and grinding the sintered mass to form fine, catalytically-active powders. The desired crystal phases are formed by high-temperature solid-state reactions occurring during sintering.

The catalytic material of the invention is particularly useful in processes for oxidizing hydrocarbons and carbon monoxide present in waste gases which comprise contacting the waste gases with the material at temperatures at least sufficient to support catalytic oxidation of the hydrocarbons and carbon monoxide by the catalyst. Typically, the catalyst will be immobilized by deposition onto a supporting structure or fabrication into a larger article, and the waste gases will be contacted as they pass over the immobilized catalytic material. The thermal stability, low reactivity with silicates, and redox stability of these catalysts are features which make them eminently suitable for use in automotive exhaust emissions control systems.

Alternative methods for forming the catalysts of the present invention in situ on refractory ceramic support structures are described in the copending application of H. L. Rittler, Ser. No. 294,073, filed Oct. 2, 1972. These methods, however, comprise no part of the present invention.

DETAILED DESCRIPTION OF THE INVENTION

The titanate catalysts of the invention may be prepared by sintering powders of oxides or carbonates of the cations associated with the catalysts. Examples of suitable starting materials include $TiO_2$, $Al_2O_3$, $Fe_3O_4$, $Co_3O_4$, $MnCO_3$, $MnO_2$, $CuO$, etc. These may be mixed to form a batch in proportions which, upon heating, will yield an oxide composition within the above-described composition region, and then sintered in air at temperatures in the range from about 1000°–1600°C., preferably about 1300°–1450°C., for at least about an hour. To assure complete reaction, the sintered mass may be crushed and resintered if desired, and the product then ground to a powder. Powders finer than about 100 mesh (U.S. Standard Sieve) are preferred.

Examination of the crystalline product of the above procedure using X-ray diffraction techniques discloses a material composed principally of titaniferous crystal phases of three basic types, depending principally upon the oxide composition of the starting mixture as calculated from the batch. These three types, which may be characterized as titaniferous solid solutions of spinel, ilmenite and pseudobrookite structure, may be found alone or in any combination.

Iron-containing titaniferous solid solutions of spinel, ilmenite and pseudobrookite structure are found in nature and have been described by Buddington and Lindsley in "Iron-Titanium Oxide Minerals and Synthetic Equivalents", Journal of Petrology, Volume 5, Part 2, pages 310-357 (1964). The solid solutions which comprise the active phases in the catalytic devices herein described are of analogous structure.

The locations of these solid solutions in the MO—M$_2$O$_3$—TiO$_2$ ternary composition system are shown in the appended DRAWING. The compositions of the solid solutions fall along the lines joining the end member components thereof, the respective solid solutions being designated by bracketed pairs of end member components followed by the notation ss. The notation ss indicates a continuous range of solid solution between the end member compounds. The oxidation states of the metals M, not shown for the bracketed end member compounds, correspond to those shown for the end member compounds at the boundaries of the ternary system.

The spinel solid solutions of the invention are characterized by cubic or pseudocubic crystalline structure and consist of titaniferous solid solutions between $M_2''TiO_4$ and $M''M_2'''O_4$ end member compositions, $M''$ and $M'''$ being selected as hereinabove described. Active end member components include $Mn_2TiO_4$, $Co_2TiO_4$ and $Fe_2TiO_4$; solid solutions between these members and other end members such as $MnAl_2O_4$, $CoAl_2O_4$, $MnFe_2O_4$, $CoFe_2O_4$, $Fe_3O_4$ and $Co_3O_4$ are also active.

The ilmenite solid solutions are characterized by hexagonal or pseudohexagonal crystalline structure, being similar in structure to naturally-occurring ilmenite, $FeTiO_3$, and consist of titaniferous solid solutions between $M''TiO_3$ and $M_2'''O_3$ end member compositions, $M''$ and $M'''$ being selected as hereinabove described. Active end members include $MnTiO_3$ and $CoTiO_3$.

The pseudobrookite solid solutions are characterized by orthorhombic or pseudo-orthorhombic crystalline structure, being similar in structure to naturally-occurring pseudobrookite, $Fe_2TiO_5$, and consist of titaniferous solid solutions between $M''Ti_2O_5$ and $M_2'''TiO_5$ end member compositions, $M''$ and $M'''$ being selected as hereinbefore described. Active end members include $MnTi_2O_5$, $CuTi_2O_5$ and $CoTi_2O_5$.

Of the above phases, the spinel and ilmenite phases are the most active, particularly when $M''$ is selected from the group consisting of $Co^{+2}$, $Cu^{+2}$ and $Mn^{+2}$. Thus, catalysts having a principal crystal phase consisting essentially of titaniferous spinel and/or ilmenite solid solutions containing these ions are preferred.

If desired, $Nb_2O_5$ may be substituted on a weight-for-weight basis for $TiO_2$ in amounts comprising up to about 25% of the total amount of titania present in the composition. This replacement has in some cases increased catalytic activity, possibly by creating cation vacancies in the crystalline structure. Also, oxides such as MgO, ZnO, NiO and $Cu_2O$ may be present in the compositions in significant proportions without destroying catalytic activity.

Particularly good activity and stability have been found in copper-manganese-titanium and cobalt-manganese-titanium ternary systems where samples sintered at 1450°C. were subjected to extended 600°C., 800°C. and 1100°C. heat treatments in air without significant degradation. The copper compositions exhibited a slight decrease in activity after the 1100°C. treatment, but the cobalt compositions were stable at all temperatures.

The catalytic activity of the base metal titanate catalysts for the oxidation of hydrocarbons and carbon monoxide is shown by differential scanning calorimeter measurements using hexane and carbon monoxide reactants. The following Table lists base metal titanate powders which have shown considerable oxidation activity. The compositions of the powders are shown in weight percent on the oxide basis as calculated from the proportions of starting compounds in the batch. Also shown are the structures of the major crystal phases determined from X-ray diffraction data, noted as Ps-B (pseudobrookite), Ilm (ilmenite) or Sp (spinel), and the projected compositions of the major phases believed to be the most active for oxidation for each example. Catalytic activity for the oxidation of hexane and carbon monoxide are listed for each material as moderate (M) or strong (S).

For all of the compositions in the Table, the total $FeO + Fe_2O_3$ is shown as $Fe_2O_3$, the total $CoO + Co_2O_3$ is shown as CoO and the total $CuO + Cu_2O$ is shown as CuO, simply as a matter of convenience in reporting the oxide composition of the batch. However, the oxidation states of the metals as reflected by the batch compositions do not necessarily correspond to their oxidation states in the active titaniferous crystal phases produced on firing. For example, the metals cobalt, manganese and iron are capable of assuming either the +2 or the +3 oxidation state in the catalysts of the invention. The distribution of these metals between the divalent and trivalent states is determined according to well-known laws governing high temperature oxidation in oxide systems, depending upon such factors as the relative ease of oxidation of the metals present, the conditions of temperature and oxygen pressure surrounding the firing treatment, and the time of firing. The actual distribution of these metals as between the +2 and +3 oxidation states may be determined using known analytical techniques, but this determination is time consuming and expensive. The active phase identifications set forth in the Table are therefore based on structural data obtained from X-ray data and the projected behavior of the oxides present under the firing conditions described, rather than upon actual chemical analysis of the active product.

All of the catalysts shown in the Table are powders formed by solid state reactions between simple oxide and carbonate batch materials upon heating the batches in air at temperatures in the range of about 1000°–1600°C. for times in excess of 1 hour.

TABLE

| Batch Oxide Composition | 1 | 2 | 3 | 4 | 5 | 6 |
|---|---|---|---|---|---|---|
| $TiO_2$ | 68.0 | 69.5 | 62.5 | 66.0 | 52.0 | 25.0 |
| $Al_2O_3$ | 9.0 | — | 13.5 | 4.5 | — | 30.0 |
| $Fe_2O_3$ | — | — | — | — | — | — |
| CoO | — | — | — | 29.5 | 48.0 | 45.0 |
| MnO | — | 30.5 | 24.0 | — | — | — |
| CuO | 15.0 | — | — | — | — | — |
| NiO | — | — | — | — | — | — |
| MgO | 8.0 | — | — | — | — | — |
| Major Phase Structure | Ps-B | Ps-B | Ps-B | Ps-B | Ilm, Sp, Ps-B | Sp, Ps-B |
| Principal Major Phase Constituents | $CuTi_2O_5$—$Al_2TiO_5$ ss | $MnTi_2O_5$ | $MnTi_2O_5$—$Al_2TiO_5$ ss | $CoTi_2O_5$—$Al_2TiO_5$ ss | $CoTiO_3$, $Co_2TiO_4$, $CoTi_2O_5$ | $Co_2TiO_4$—$ClAl_2O_4$ ss, $CoTi_2O_5$—$Al_2TiO_5$ ss |
| Catalytic Activity Hexane | M | M | M | M | S | M |
| Co | M | M | M | M | S | S |

TABLE-continued

| Batch Oxide Composition | 1 | 2 | 3 | 4 | 5 | 6 |
| --- | --- | --- | --- | --- | --- | --- |

| Batch Oxide Composition | 7 | 8 | 9 | 10 | 11 | 12 |
| --- | --- | --- | --- | --- | --- | --- |
| $TiO_2$ | 40.0 | 68.0 | 53.0 | 25.0 | 40.0 | 52.0 |
| $Al_2O_3$ | 20.0 | — | — | 30.0 | 20.0 | 15.0 |
| $Fe_2O_3$ | — | — | — | — | — | — |
| CoO | 40.0 | 32.0 | — | — | — | — |
| MnO | — | — | 47.0 | 45.0 | 40.0 | 30.0 |
| CuO | — | — | — | — | — | — |
| NiO | — | — | — | — | — | — |
| MgO | — | — | — | — | — | — |
| $Nb_2O_5$ | — | — | — | — | — | 5.0 |
| Major Phase Structure | Sp, Ps-B | Ps-B | Ilm | Sp, Ilm, Ps-B | Ilm, Sp, Ps-B | Ps-B, Ilm, Sp |
| Principal Major Phase Constituents | $CoTiO_4$—$CoAl_2O_4$ ss, $CoTi_2O_5$—$Al_2TiO_5$ ss | $CoTi_2O_5$ | $MnTiO_3$ | $Mn_2TiO_4$—$MnAl_2O_4$ ss, $MnTiO_3$—$Mn_2O_3$ ss, $MnTi_2O_5$—$Al_2TiO_5$ ss | $MnTiO_3$—$Mn_2O_3$ ss, $Mn_2TiO_4$—$MnAl_2O_4$ ss, $MnTi_2O_5$—$AlTiO_5$ ss | $MnTiO_3$—$Mn_2O_3$ ss, $MnTi_2O_5$—$AlTiO_5$ ss, $Mn_2TiO_4$—$MnAl_2O_4$ ss |
| Catalytic Activity | | | | | | |
| Hexane | M | M | S | S | S | M |
| CO | S | M | S | M | M | M |

| Batch Oxide Composition | 13 | 14 | 15 | 16 | 17 | 18 | 19 |
| --- | --- | --- | --- | --- | --- | --- | --- |
| $TiO_2$ | 26.0 | 51.0 | 23.5 | 35.5 | 34.5 | 41.0 | 21.0 |
| $Al_2O_3$ | — | — | — | — | — | — | — |
| $Fe_2O_3$ | 38.5 | 25.5 | 11.5 | — | 34.5 | 41.0 | 21.0 |
| CoO | 25.5 | 23.5 | 65.0 | 49.5 | — | — | 58.0 |
| MnO | — | — | — | 15.0 | 15.0 | 18.0 | — |
| CuO | — | — | — | — | — | — | — |
| NiO | — | — | — | — | 16.0 | — | — |
| MgO | — | — | — | — | — | — | — |
| $Nb_2O_5$ | — | — | — | — | — | — | — |
| Major Phase Structure | Sp | Sp | Sp | Sp | Sp | Sp | Sp |
| Principal Major Phase Constituents | $Co_2TiO_4$—$CoFe_2O_4$—$Fe_3O_4$ ss | $Co_2TiO_4$—$CoFe_2O_4$—$Fe_3O_4$ ss | $Co_2TiO_4$—$CoFe_2O_4$—$Fe_3O_4$ ss | $Co_2TiO_4$—$Mn_2TiO_4$—$Mn_3O_4$ ss | $Ni_2TiO_4$—$Mn_2TiO_4$—$Fe_2TiO_4$—$Fe_3O_4$ ss | $Mn_2TiO_4$—$MnFe_2O_4$—$Fe_3O_4$ ss | $Co_2TiO_4$—$CoFe_2O_4$ ss |
| Catalytic Activity | | | | | | | |
| Hexane | S | M | M | M | S | S | M |
| CO | M | M | S | S | S | S | S |

The described base metal titanate catalysts offer several advantages for the oxidation of hydrocarbons and carbon monoxide in automobile exhaust gases. The crystal phases produced are basically stable and refractory, with melting or decomposition temperatures well above 1000°C., sometimes above 1500°C. The phases are normally resistant to a wide range of redox conditions; for example, $FeTiO_3$ is more resistant to both oxidation and reduction than is FeO. Also, the titanates are characteristically nonreactive with silicates as shown by the general lack of titanosilicates. Thus, little reaction is expected to occur between a silicate support structure and a base metal titanate catalyst supported thereon.

The use of the described base metal titanate catalysts in automotive exhaust emissions control systems typically involves the application of a coating of the crystalline catalyst to a refractory ceramic support structure. Ceramic support structures of the honeycomb type such as are described, for example, in the patent to Hollenbach, U.S. Pat. No. 3,112,184, are preferred. These structures are lightweight and have high surface area-to-volume ratios which help to maximize the efficiency of supported catalysts in treating gases passing therethrough. They are typically composed of metal oxides or compounds thereof such as, for example, silica, alumina, magnesia, zirconia, spodumene, cordierite, mullite and the like.

A coating of the catalyst is suitably deposited on the ceramic support structure by briefly immersing the structure into a slurry consisting essentially of the crystalline catalyst and a binder, drying the coating of slurry adhering to the structure, and firing the coated structure to bond the catalyst thereto. The immersion and drying steps may be repeated to increase the thickness of the catalyst coating, if desired. Firing of the dried coating at temperatures in excess of the projected maximum use temperature of the device are preferred, so that the byproducts of the binder decomposition reaction are removed prior to use. Thus firing temperatures in the range from about 800°–1200°C. are typically employed, with 1100°–1200°C. temperatures being particularly preferred. Treatments of about 1–2 hours duration in the preferred range of temperatures are sufficient to achieve stability in the catalyst coatings.

Binders suitable for use in forming a catalyst coating on a ceramic monolith include organic liquid binders such as polyvinyl alcohol and polyethylene glycols, or soluble organic binders such as sugar, used in combination with liquid vehicles such as water. Binders which are essentially completely removed by the firing process are preferred.

The stability of supported catalysts prepared according to the described procedure for treating gaseous mixtures to oxidize constituents such as carbon monoxide and unburned hydrocarbons present therein is measured by a bench testing procedure wherein simulated exhaust gases are passed through a catalyst-bearing structure. The simulated exhaust gases contain known quantities of carbon monoxide and propylene, and the efficiency of the catalyst is judged according to the reaction temperature required to remove specified quantities of these constituents. Thus, a more active catalyst is capable of removing a given proportion of the available carbon monoxide and propylene at lower temperatures than is a less active catalyst.

The following examples illustrate in greater detail the process by which useful catalytic devices are prepared employing the base metal titanate catalysts of the invention.

EXAMPLE I

A base metal titanate catalyst is prepared by sintering a mixture of $TiO_2$, $Fe_3O_4$ and $Co_3O_4$ in air at about 1400°C. for 2 hours. The sintered product, which consists in weight percent on the oxide basis as calculated from the batch of about 37.4% CoO, 26.6% $TiO_2$ and 35.9% $Fe_3O_4$, is then crushed to a powder finer than 100 mesh (U.S. Standard sieve). X-ray examination of the product shows the presence of a major crystal phase of spinel structure wherein a $Co_2TiO_4$—$CoFe_2O_4$—$Fe_3O_4$ solid solution is thought to predominate.

The catalyst prepared as described is mixed with polyvinyl alcohol to form a slurry, and the slurry is applied to a cylindrical cordierite monolithic ceramic support structure of the honeycomb-type, 1 inch in diameter and 2-5/16 inches in length, by briefly immersing the structure in the slurry. The viscosity of the slurry is not critical, but is adjusted so that the cells of the honeycomb structure are not plugged by the immersion process. The coated support structure is then dried for several minutes in a hot air oven at 90°C. The coating and drying steps are repeated several times to increase the thickness of the coating, and then the coated structure is fired in air for 2 hours at 1200°C. to bond the coating to the ceramic. From the weight increase of the support structure it is determined that a catalyst loading comprising about 42.5% of the weight of the coated support structure has been achieved.

The catalyst-bearing support structure prepared as described is then tested for catalytic activity by passing a simulated exhaust gas mixture containing 0.9% CO, 0.0225% propylene, 1.125% oxygen, 10% water vapor and the remainder nitrogen by volume through the structure at a space velocity of 15,000 hr.$^{-1}$ at elevated temperatures, determining the proportion of carbon monoxide and propylene oxidized as a function of temperature. The catalyst structure prepared as described is found to remove 20% of the carbon monoxide and 20% of the propylene present in the moving gas stream at temperatures of 700°F. and 700°F., respectively.

EXAMPLE II

A base metal titanate catalyst is prepared by sintering a mixture of $TiO_2$, $Fe_3O_4$, $MnCO_3$ and NiO in air at about 1400°C. for about 2 hours. The sintered product, which consists in weight percent on the oxide basis as calculated from the batch of about 34.3% $TiO_2$, 30.9% $Fe_2O_3$, 18.7% $MnO_2$ and 16.1% NiO, is crushed to a powder finer than about 325 mesh (U.S. Standard Sieve). X-ray examination of the product shows the presence of a major phase of spinel structure wherein a $Mn_2TiO_4$—$Ni_2TiO_4$—$Fe_2TiO_4$—$Fe_3O_4$ solid solution is thought to be the principal constituent. The presence of some rutile is also evidenced by the X-ray data.

The catalyst prepared as described is then mixed with 20 M Carbowax polyethylene glycol to form a slurry, and the slurry is applied to a cordierite monolithic ceramic support structure to form a catalyst-binder coating according to the application procedure described in Example I. The coated structure is then fired in air for 1 hour at 1150°C., cooled and weighed, and the resulting catalyst coating is found to comprise about 38.5% of the weight of the coated support structure.

The catalyst-bearing monolithic support structure is then tested for catalytic activity according to the procedure of Example I, and is found to remove 20% of the carbon monoxide and 20% of the propylene from a moving gas stream at temperatures of 760°F. and 810°F., respectively.

Devices similar to those shown in the foregoing examples, employing any of the catalysts of the invention, may be used to treat automotive exhaust gases according to conventional procedures involving insertion of the devices into the exhaust stream to obtain contact between the exhaust gases and the catalyst. The addition of excess air or oxygen to the exhaust stream prior to contact with the catalyst is useful but not required. Oxygen levels ranging from about 0.8–10% by volume at exhaust pressures ranging from one atmosphere to 10 psig permit useful carbon monoxide and hydrocarbon removal levels to be obtained. At space velocities ranging about 100–200,000 hr.$^{-1}$, honeycomb devices coated with the base metal titanate catalysts of the invention achieve useful conversion efficiencies at catalyst temperatures of 700°F. and above, with peak operating temperatures ranging as high as about 2000°F. (about 1100°C.) being permitted in many cases without substantial catalyst degradation. Preferred catalyst operating temperatures for automotive applications range from about 1000°–1600°F.

While the foregoing example illustrates in detail the preferred procedures for utilizing the catalysts of the invention for automotive emissions control applications, it will be appreciated that any of the well known alternative devices and procedures known in the prior art for insuring intimate contact between flowing exhaust gases and catalysts may be employed for this purpose.

We claim:

1. A process for catalytically oxidizing hydrocarbons and carbon monoxide present in a moving gas stream which comprises the step of contacting the moving gas stream at a catalyst temperature in the range of about 700°–2000°F. with a crystalline catalytic material consisting essentially, in weight percent on the oxide basis, of about 15–85% $TiO_2$, 15–70% M''O, wherein M'' is selected from the group consisting of $Mn^{+2}$, $Co^{+2}$, $Cu^{+2}$ and $Fe^{+2}$, and 0–60% $M_2'''O_3$, wherein M''' is selected from the group consisting of $Al^{+3}$, $Fe^{+3}$, $Mn^{+3}$, $Cr^{+3}$ and $Co^{+3}$, said material having a major crystal phase consisting of at least one crystalline species selected from the group consisting of titaniferous solid solutions of spinel ($M_2''TiO_4$—$M''M_2'''O_4$), ilmenite ($M''TiO_3$—$M_2'''O_3$) and pseudobrookite ($M''Ti_2O_5$—$M_2'''TiO_5$) structure.

2. A process according to claim 1 wherein M'' is selected from the group consisting of $Co^{+2}$, $Cu^{+2}$ and $Mn^{+2}$, and wherein said material has a principal crystal phase consisting essentially of titaniferous spinel and/or ilmenite solid solutions.

3. A process according to claim 1 wherein said crystalline catalytic material consists essentially of cobalt, manganese, and titanium oxides.

4. A process according to claim 1 wherein said crystalline catalytic material consists essentially of copper, manganese, and titanium oxides.

5. A process according to claim 1 wherein said moving gas stream comprises automotive exhaust gases.

6. A process according to claim 5 wherein the catalyst temperature ranges from about 1000°–1600°F.

* * * * *